E. A. McKOY AND G. D. MOORE.
STUMP HARVESTER.
APPLICATION FILED SEPT. 21, 1917. RENEWED JULY 9, 1919.
1,313,708.
Patented Aug. 19, 1919.
2 SHEETS—SHEET 2.
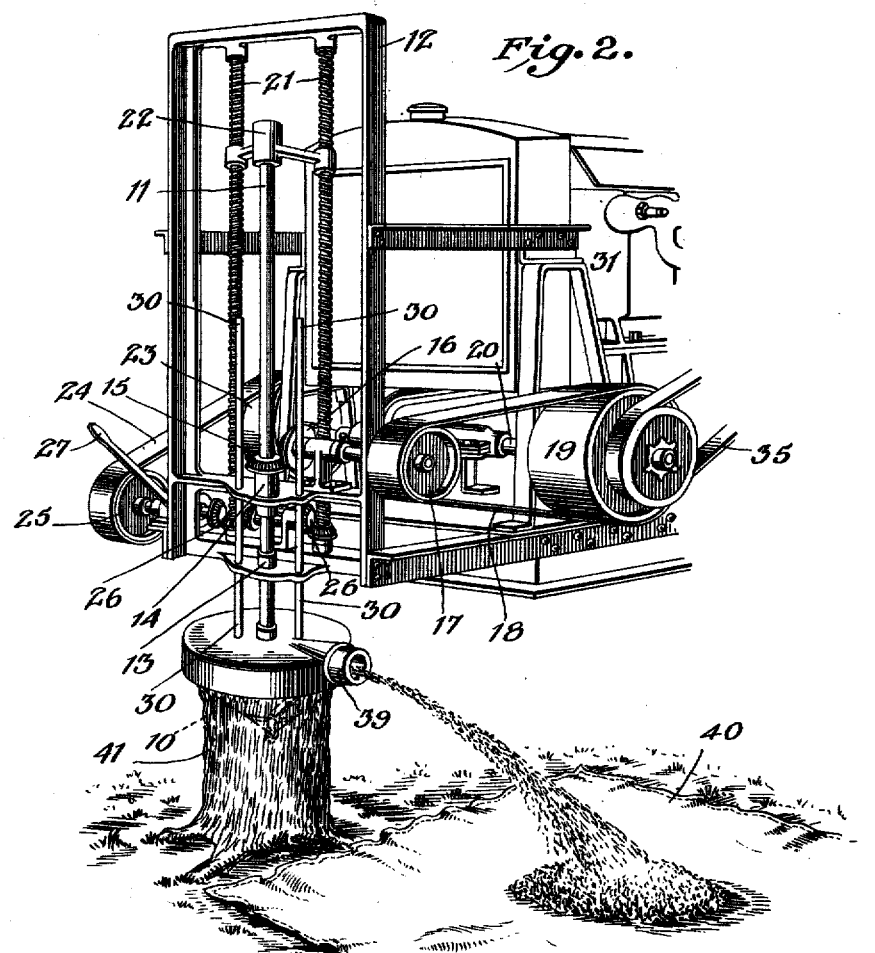
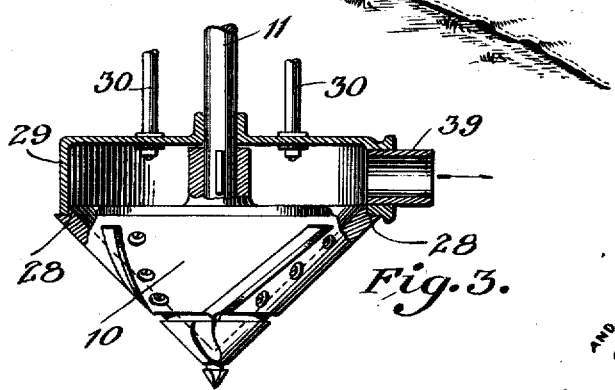
Inventor
Edwin A. McKoy
George D. Moore

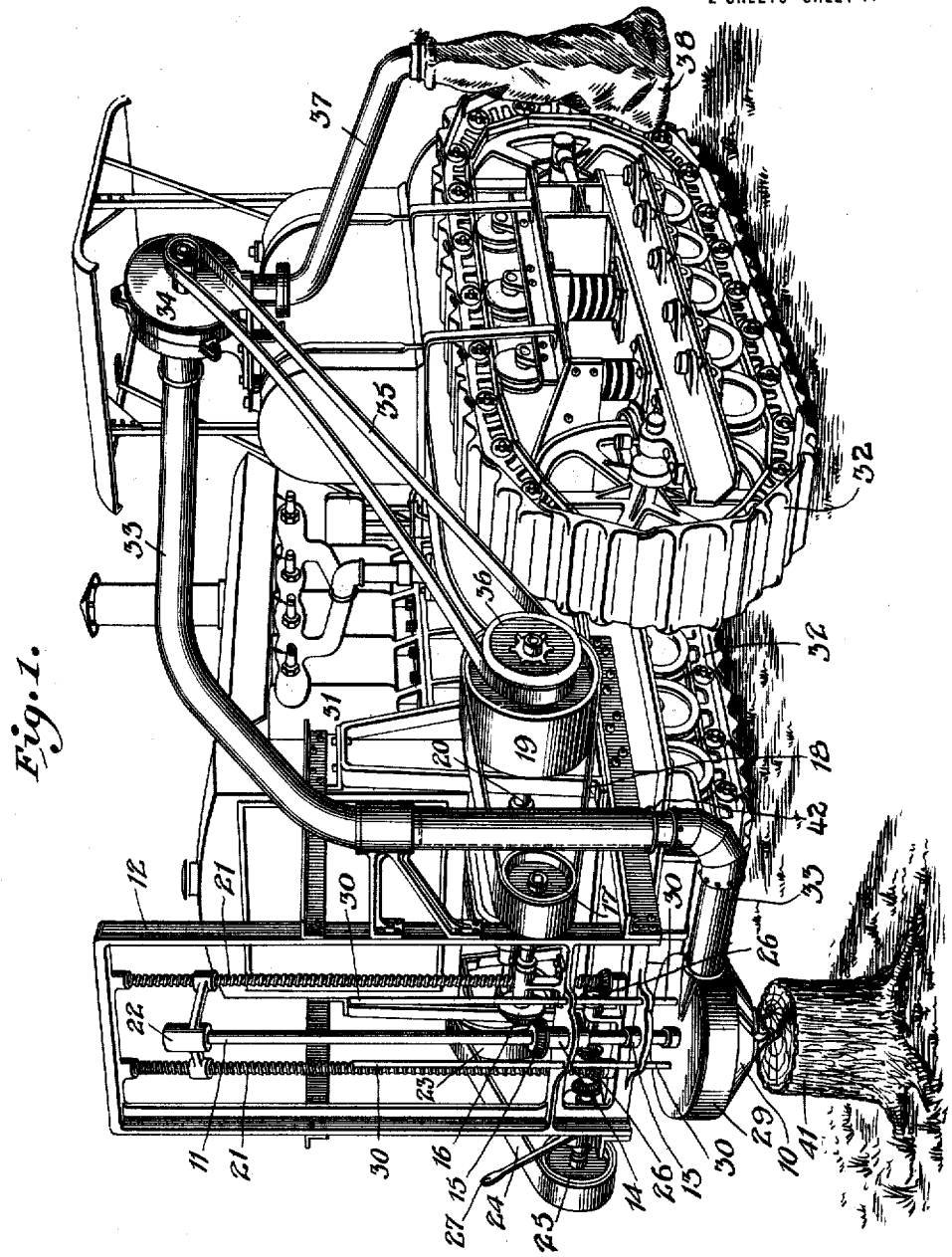

UNITED STATES PATENT OFFICE.

EDWIN A. McKOY AND GEORGE D. MOORE, OF NEW ORLEANS, LOUISIANA.

STUMP-HARVESTER.

1,313,708.      Specification of Letters Patent.      Patented Aug. 19, 1919.

Application filed September 21, 1917, Serial No. 192,566. Renewed July 9, 1919. Serial No. 309,766.

*To all whom it may concern:*

Be it known that we, EDWIN A. McKOY and GEORGE D. MOORE, citizens of the United States, residing at New Orleans, in the parish of Orleans and State of Louisiana, have invented certain new and useful Improvements in Stump-Harvesters; and they do hereby declare the following to be a full, clear, and exact description of the invention, such as will enable others skilled in the art to which it appertains to make and use the same.

This invention relates to mechanisms for disintegrating and thereby removing standing stumps and when the material so disintegrated contains valuable ingredients of conserving the disintegrated material for further processing.

A further object of the invention is to provide a machine having a boring tool mounted upon a self-propelled dirigible vehicle containing its own power whereby the vehicle and boring tool may be moved from stump to stump and the stump operated upon to disintegrate all the woody material above the ground and a considerable portion of that below the ground.

A further object of the invention is to provide in conjunction with such boring tool, means for conserving the cuttings from the boring tool and directing them to some form of receiving device or storage capacity whereby such cuttings may be taken away and further used.

A further object of the invention is to provide a boring tool having a housing surrounding the upper portion thereof to receive the cuttings from the boring tool, such housing being provided with means to conduct the borings or cuttings from the housing to a receptacle.

With these and other objects in view, the invention comprises certain novel constructions, combination and arrangement of parts as will be hereinafter more fully described and claimed.

In the drawing:

Figure 1 is a perspective view of the improved mechanism mounted upon a dirigible power plant of the type ordinarily known as a caterpillar;

Fig. 2 is a perspective view of the invention disclosing a different manner of conserving the cuttings from the boring tool, and Fig. 3 is a view partly in side elevation and partly in diametrical section of the boring tool and housing therefor.

Like characters of reference designate corresponding parts throughout the several views.

The improved stump harvesting mechanism which forms the subject matter of this application comprises a boring tool 10 carried by a vertical shaft 11 which in turn is mounted upon a frame 12. The shaft 11 is mounted in any manner to move vertically, that is to say, longitudinally of its major axis relative to the frame 12 and is here shown as operating through bearings 13 and 14. The shaft is driven by means of a bevel gear 15 splined upon such shaft to move vertically, the said gear being in turn driven by the bevel gear 16 from the pulley 17. The pulley 17 is driven by a belt 18 from the pulley 19 which is carried upon the engine shaft 20.

Mounted also upon the frame 12 are screws 21 carrying a yoke 22 receiving the end of the shaft 11 and acting as a thrust bearing as the yoke 22 is moved downwardly by rotating the screws 21.

For rotating the screws 21 a pulley 23 is mounted upon the engine shaft and through the medium of a belt 24 driving a pulley 25 which, in turn, drives a train of gears 26 thereby rotating the screws 21, some of said train of gears 26 being rigidly carried upon such screws. Any usual and ordinary type of reversing mechanism is employed for driving the screws in either direction to either raise or lower the cutting tool 10 such reversing mechanism being shown conventionally at 27.

The cutting tool 10 is provided about its upper and outer periphery with a furrow indicated at 28 (seen at Fig. 3) into which a housing 29 fits, the housing 29 being held against rotating in any improved manner, as by the guide rod 30 while moving vertically with the cutting tool. This specific type of cutting tool forms no part of the present invention but is made the subject matter of a separate application, Serial Number 192,567 filed on even date herewith.

The entire cutting mechanism is mounted upon a self-propelled vehicle (shown conventionally at Fig. 1) having an engine 31 and traction devices 32 whereby the cutting mechanism is moved from place to place.

As shown at Fig. 1 a pneumatic pipe 33 is connected with the housing 29 which leads to a fan exhaust 34 located at any convenient place upon the vehicle. As shown at Fig. 1 the fan exhaust 34 is driven by means of a belt 35 from a pulley 36 mounted upon the engine shaft. A discharge pipe from the fan 34 is also provided leading to any receptacle for receiving the cutting generically shown by the bag 38.

It is not, however, found necessary under all conditions to convey the cuttings through any pneumatic device as the centrifugal force of the cutting tool itself will throw the cuttings through the opening in the housing shown at 29 and the same may be caught in or upon any convenient receptacle as the sheet 40.

In operation the mechanism is driven by its self-contained power and guided to a standing stump as indicated at 41 until the boring tool 10 is properly positioned relative to the major axis of such stump. By driving the cutting tool 10 through the medium of the shaft 11 and its connecting gearing to the pulley 19 rotary movement of such cutting tool is effected. Simultaneously the screws 21 are rotated to move the boring tool downwardly so that the rotating movement of the cutting tool acts upon the stumps 41 to disintegrate the material of the stump. The disintergrated material is then carried through the pneumatic pipe 33 to the bag or other receptacle 38 or is discharged by centrifugal force through the sleeve 39 upon the sheet 40. The wood of standing stumps often contains material which can be chemically or otherwise removed from the woody fiber and such material so removed, used in a commercial way while the fibrous material itself may be employed in many different ways the utilization of such disintegrated material forming the subject matter of other application.

To permit the downward movement of the housing 29 a telescope joint is provided in the pneumatic pipe 33 as shown at 42.

We claim:

1. In a stump harvester, a dirigible power plant, a boring tool comprising a cutter head having a recess opposite its cutting surface, a housing forming with the recess a chamber to receive the cuttings and means to discharge the cuttings from the housing to a pre-determined depository.

2. In a stump harvester, a dirigible power plant, a horizontally, rotatable, vertically movable boring tool comprising a cutter head having a recess opposite its cutting surface, a housing forming with the recess a chamber to receive the cuttings and means to discharge the cuttings from the housing to a predetermined depository.

3. In a stump harvester, a power carrying vehicle, a boring tool mounted upon the vehicle and comprising a cutter head having a recess opposite its cutting face, a housing forming with the recess a chamber to receive the cuttings, means to discharge the cuttings from the housing to a pre-determined depository and means to actuate the boring tool from the power.

4. In a stump harvester, a power carrying vehicle, a horizontally, rotatable, vertically movable boring tool comprising a cutter head having a recess opposite its cutting surface, a housing forming with the recess a chamber to receive the cuttings, means to discharge the cuttings from the housing to a pre-determined depository and means to independently rotate and vertically advance the boring tool and housing.

5. In a stump harvester, a power carrying vehicle, a boring tool carried by the vehicle comprising a cutter head having a recess formed opposite its cutting surface, a housing forming with the recess a chamber to receive the cuttings, means to discharge the cuttings from the housing to a pre-determined depository, means to rotate the boring tool from the vehicle, means to move the boring tool vertically by power from the vehicle and means to prevent rotation of the housing but permitting vertical movement of the housing with the boring tool.

6. In a stump harvester, a dirigible power plant, a boring tool carried by the power plant and comprising a dished cutter head having its cutting element upon the exterior, a housing embracing the head and forming with the recess of the head a chamber to receive the cuttings, means to discharge the cuttings from the housing to a pre-determined depository and means to move the boring tool vertically independently of its rotating movement.

7. In a stump harvester, a dirigible power plant, a horizontally, rotatable, vertically movable boring tool comprising a dished cutter head having its cutting element upon the exterior, a housing embracing the head and forming with the recess of the head a chamber to receive the cuttings, means to discharge the cuttings from the housing to a pre-determined depository, means to drive the boring tool from the power plant, and independent means for accomplishing vertical movement of the boring tool.

8. In a stump harvester, a power carrying vehicle, a boring tool mounted upon the vehicle comprising a dished cutter head having its cutting element upon the exterior, a housing embracing the head and forming with the head a chamber to receive the cuttings, means to discharge the cuttings from the housing to a pre-determined depository and means to actuate the boring tool from the power.

9. In a stump harvester, a power carrying vehicle, a horizontally, rotatable, vertically movable boring tool comprising a dished cutter head having its cutting element upon the exterior, a housing embracing the head and forming with the recess of the head a chamber to receive the cuttings, means to discharge the cuttings from the housing to a pre-determined depository and means to independently rotate and advance the boring tool from the power plant.

10. In a stump harvester, a power carrying vehicle, a boring tool carried by the vehicle comprising a dished cutter head having its cutting element upon the exterior, a housing embracing the head and forming with the recess of the head a chamber to receive the cuttings, means to discharge the cuttings from the housing to a pre-determined depository, means to rotate the boring tool from the vehicle, means to move the boring tool vertically by power from the vehicle and means to prevent rotation of the housing while permitting vertical movement of the housing with the boring tool.

11. In a stump harvester, a dirigible power plant, a boring tool carried by the power plant comprising a discoid cutter head having a cutting element upon one face and a recess opposed thereto, a housing embracing the head and forming with the recess a chamber to receive the cuttings, means to discharge the cuttings from the housing to a pre-determined depository, means to rotate the boring tool from the power plant and means to move the boring tool vertically independently of its rotating movement.

12. In a stump harvester, a dirigible power plant, a horizontally, rotatable, vertically movable boring tool comprising a discoid cutter head having a cutting element upon one face and a recess opposed thereto, a housing embracing the head and forming with the recess a chamber to receive the cuttings, means to discharge the cuttings from the housing to a pre-determined depository, means to drive the boring tool from the power plant and independent means for accomplishing vertical movement of the boring tool.

13. In a stump harvester, a power carrying vehicle, a boring tool mounted upon the vehicle and comprising a discoid cutter head having a cutting element upon one face and recess opposed thereto, means to actuate the boring tool from the power, a housing embracing the cutter head and forming with the recess a chamber to receive the cuttings, means to discharge the cuttings from the housing to a pre-determined depository and means to actuate the boring tool from the power.

14. In a stump harvester, a power carrying vehicle, a boring tool driven from the power and comprising a cutter head having a recess opposite its cutting surface, a housing forming with the recess a chamber to receive the cuttings, means to drive the boring tool from the power, a pipe forming communication from the housing to an exhaust mechanism and means to discharge the cuttings from the exhaust mechanism.

15. In a stump harvester, a power carrying vehicle, a cutting tool carried by and driven from the power comprising a cutter head having a recess opposite its cutting surface, a housing forming with the recess a chamber to receive the cuttings, an exhaust mechanism, a conduit leading from the cutting tool to the exhaust mechanism and provided with means for compensating for the movement of the cutting tool, means to drive the exhaust mechanism and means to discharge the cuttings from the exhaust mechanism.

In testimony whereof we affix our signatures.

EDWIN A. McKOY.
GEORGE D. MOORE.